US00RE42417E

(19) United States
(12) Reissued Patent
Hayes

(10) Patent Number: US RE42,417 E
(45) Date of Reissued Patent: Jun. 7, 2011

(54) ROLLFORMING APPARATUS FOR FORMING PROFILE SHAPES

(75) Inventor: Thomas C. Hayes, Rotorua (NZ)

(73) Assignee: Hayes International, Rotorua (NZ)

(21) Appl. No.: 11/810,446

(22) PCT Filed: Nov. 1, 1995

(86) PCT No.: PCT/NZ95/00112

§ 371 (c)(1),
(2), (4) Date: Sep. 16, 1996

(87) PCT Pub. No.: WO96/22167

PCT Pub. Date: Jul. 25, 1996

Related U.S. Patent Documents

Reissue of:
(64) Patent No.: 5,855,133
Issued: Jan. 5, 1999
Appl. No.: 08/704,687
Filed: Sep. 16, 1996

(30) Foreign Application Priority Data

Jan. 19, 1995 (NZ) ..... 270366

(51) Int. Cl.
*B21D 5/00* (2006.01)
*B21D 5/14* (2006.01)

(52) U.S. Cl. ..... 72/176; 72/181; 72/240; 72/246

(58) Field of Classification Search ..... 72/240, 72/245, 246, 244, 181, 182, 176, 179, 196, 72/243.2

See application file for complete search history.

(56) References Cited

U.S. PATENT DOCUMENTS

| | | | | |
|---|---|---|---|---|
| 3,077,131 | A | 2/1963 | McShane | |
| 3,138,979 | A | 6/1964 | Sendzimir | |
| 3,577,760 | A * | 5/1971 | Franke | 72/215 |
| 3,691,810 | A | 9/1972 | Sendzimir | |
| 4,019,358 | A | 4/1977 | Frohling et al. | |
| 4,109,499 | A | 8/1978 | Brooks et al. | |
| 4,156,453 | A | 5/1979 | Scheinecker | |

FOREIGN PATENT DOCUMENTS

| | | |
|---|---|---|
| FR | 1380583 | 10/1963 |
| WO | 94/16839 | 8/1994 |

* cited by examiner

*Primary Examiner* — Dana Ross
*Assistant Examiner* — Debra M Sullivan
(74) *Attorney, Agent, or Firm* — Michael G. Johnston; Deborah H. Spencer; Moore & Van Allen PLLC

(57) ABSTRACT

The present invention provides means for automatically adjusting rollforming equipment to accommodate a range of different gauges of material such as sheet metal being formed. One rollforming roller (34) on each rollforming head (4A) is mounted on an eccentric so that a force supplied in the direction of material feed through the tooling rollers (33,34) will increase the tooling gap therebetween. An automatic gauge adjustor includes applying a source of substantially constant pressure sufficient to achieve the rollforming action against rotation about the eccentric while allowing movement of the rollforming roller also about the eccentric so that the roll will move against the pressure being provided in the direction of the material feed to accommodate the gauge of material within the working range set. This allows the rollforming head (4A) to adjust the rolling gap between rollers to accommodate varying gauges automatically and with minimal or no lead in damage while the rolls adjust to the new gauge of material.

3 Claims, 4 Drawing Sheets

ROLLFORMING APPARATUS FOR FORMING PROFILE SHAPES

Matter enclosed in heavy brackets [ ] appears in the original patent but forms no part of this reissue specification; matter printed in italics indicates the additions made by reissue.

*CROSS-REFERENCE TO RELATED APPLICATIONS*

This application, *U.S. patent application Ser. No. 11/810,446, is a reissue application of U.S. patent application Ser. No. 08/704,687, filed Sep. 16, 1996, entitled "Rollforming Apparatus For Forming Profile Shapes" in the name of Hayes, T., which* is *a* 371 [of] *application that claims the priority of International Patent Application No.* PCT/NZ95/00112, filed Nov. 1, 1995, *entitled "Improvements in/or relating to Rollformers" in the name of Hayes, T., which in turn claims priority to Application No. 270366 (NZ), filed Jan. 19, 1995.*

This invention relates to rollforming apparatus and in particular rollforming stations with automatic gauge setting at said rollforming stations.

BACKGROUND

Rollforming apparatus has been developed in various configurations to produce profile shapes from sheet or coiled formable material such as sheet metal. The rollforming apparatus must be able to accommodate a range of material gauges. In the past this has been achieved by mechanical adjustment of the rollforming heads. This adjustment may be effected manually or there may be complex servo assisted adjusting devices for positioning the tooling clearances to match the thickness of the material being formed. Another approach is to cause one rollforming roller to rise linearly against the action of an appropriate biasing force.

All of the existing means of adjusting rollforming apparatus to accommodate varying material thicknesses are either complex and expensive, time consuming, or have a tendency to damage the lead in section of the material being formed.

It is therefore an object of the present invention to provide rollforming apparatus and in particular rollforming stations with automatic gauge setting means at said rollforming stations which will accommodate a range of different gauges of material while minimising damage to the material being formed particularly during adjustment to a new gauge of material.

PRESENT INVENTION

Accordingly the present invention consists in a rollforming station comprising, a tooling pedestal including a mounting means to enable mounting on the bed of rollforming apparatus, a rollforming head operatively mounted on said tooling pedestal said rollforming head having a first tooling roller [rotatably] mounted on a shaft *that is rotatably* supported by said pedestal, and a second tooling roller, [also] rotatably mounted on a shaft *rotatably* supported by said pedestal with the [shaft of the second roller situated to one side with reference to the centre of the second tooling roller] *axis of rotation of the second roller offset relative to the axis of rotation of the shaft relative to the pedestal* so that a force applied in the direction of material feed through the tooling roller will increase the tooling gap between the first and second tooling rollers and an automatic gauge adjustor including reaction means to resist the movement of the second tooling roller to increase the tooling gap, said reaction means applying a source of substantially constant pressure sufficient to achieve the rollforming action while allowing movement of the second rollforming roller about the eccentric mounting so that the second tooling roller will move against the reaction means in the direction of the material feed within a working range to accommodate the gauge of material being fed.

The invention further consists in rollforming apparatus using rollforming stations with the automatic gauge setting as set forth in the preceding paragraph.

DRAWING DESCRIPTION

One preferred form of the invention and modifications thereof will now be described with reference to the accompanying drawings in which;

FIG. 1 is a plan view of rollforming apparatus according to the present invention, FIG. 2 is a side elevation of the apparatus illustrated in FIG. 1, FIG. 3 is a pictorial view of one type of rollforming station according to the present invention, FIG. 4 is a pictorial view of a second rollforming station according to the present invention, FIG. 5 is a pictorial view of a modified rollforming head according to the present invention allowing repositioning of the rollforming rollers on the pedestal.

Figure 1:
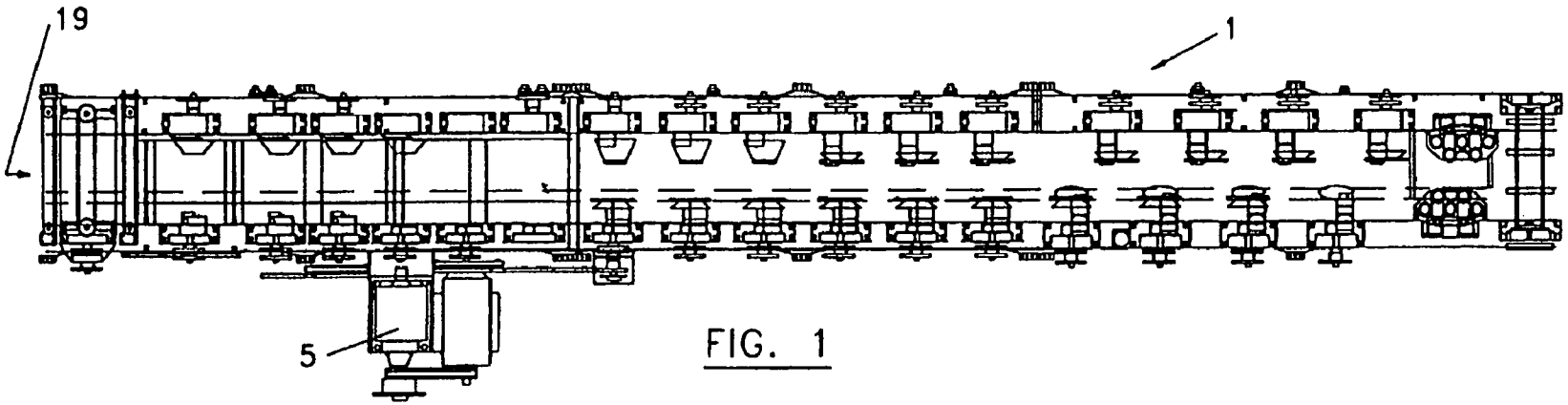
Figure 2:
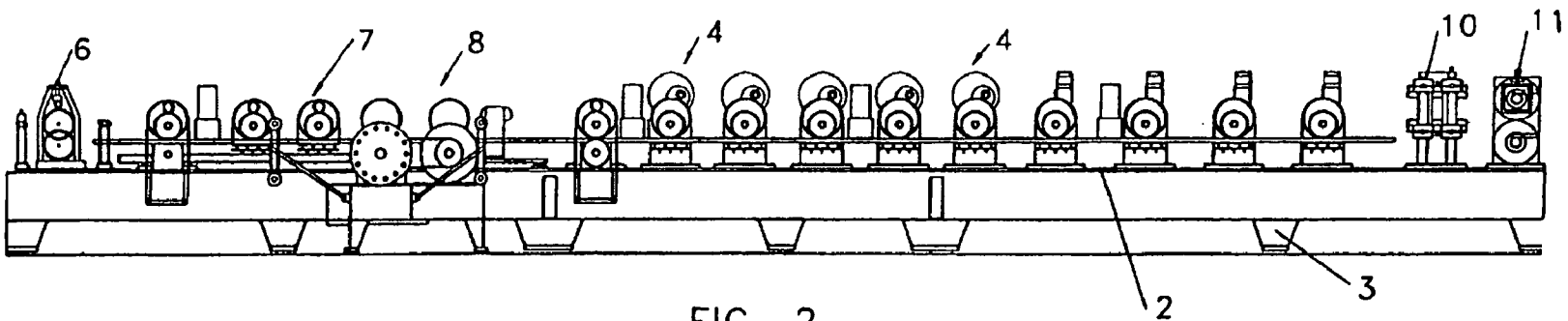

FIGS. 9a-e set out diagrammatically a series of alternative reaction means which may be employed in the automatic gauge adjuster.

PREFERRED EMBODIMENT

The present invention is concerned with rollforming apparatus for use in forming various profile shapes from sheet or coiled material. The apparatus 1 has a machined support bed 2 suitably mounted on a frame 3 to provide the support for rollforming stations 4. The train of rollforming stations in the apparatus are driven by a main drive motor 5 through suitable transmission means. The overall layout of the apparatus generally conforms to known rollforming apparatus with a pinch feed station 6, a series of lip stations 7, a correction station 8 and the rollforming web stations 4 through a series of stations with nine being illustrated in the accompanying drawings. A corrector station 10 and a drive out station 11 completes the apparatus.

Figure 3:
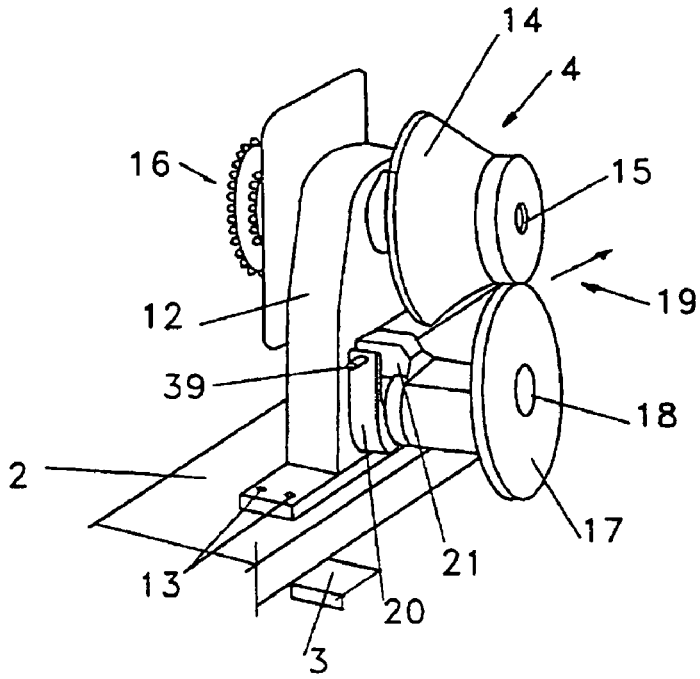

The rollforming station 4 as illustrated in FIG. 3 is one of the leading web stations in the rollforming apparatus and has a tooling pedestal 12 with mounting apertures 13 to receive mounting studs to fix the pedestal onto the bed 2 of the apparatus 1. The rollforming head operatively mounted on the tooling pedestal 12 is made up of a first tooling roller 14 mounted on a shaft 15 rotatably supported in the pedestal 12. A second tooling roller 17 is *rotatably* mounted on a shaft 18 also rotatably supported by the pedestal 12. [The tooling roller 17 is mounted on the shaft 18 to one side with reference to the centre of the tooling roller 17] *The axis of rotation of the tooling roller 17 is offset relative to the axis of rotation of the shaft relative to the pedestal*, thus providing an eccentric mounting for the tooling roller 17. The eccentric mounting is arranged so that a force applied in the direction of material feed indicated by arrow 19 will increase the tooling gap between the rollers 14 and 17 and an automatic gauge adjuster is provided to control this movement. The [shafts] *shaft 15* is connected to transmission and drive means 16 in the conventional way.

The automatic gauge adjuster in the tooling rollers illustrated in FIG. 3 incorporates a support frame 20 attached to the pedestal 12 and an abutment 21 attached to the [tooling roller 17] *shaft 18*. The abutment is moveable [about] *with* the eccentric and moves relative to the support frame and a reaction means obscured in FIG. 3 resists this movement and thus controls the tooling gap between the rolls 14 and 17.

Figure 4:
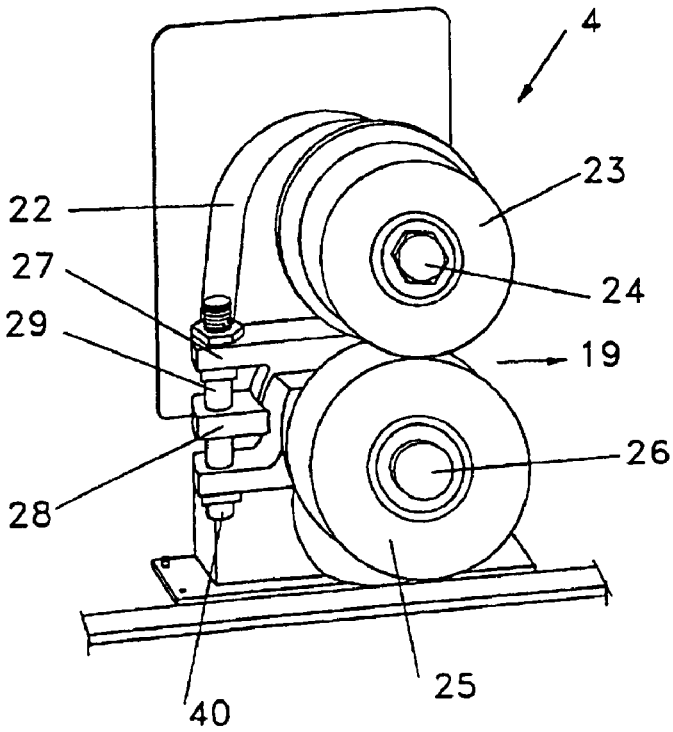
Figure 8:
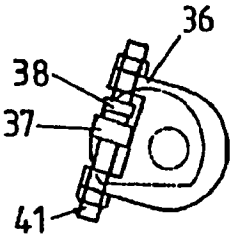
FIG. 8 is a detail of the automatic gauge adjuster.
Figure 7:
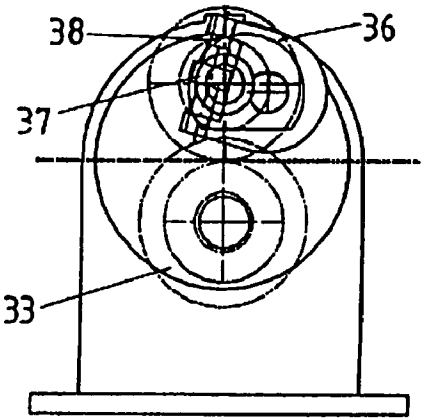
FIG. 7 is an end elevation of FIG. 5.
Figure 6:
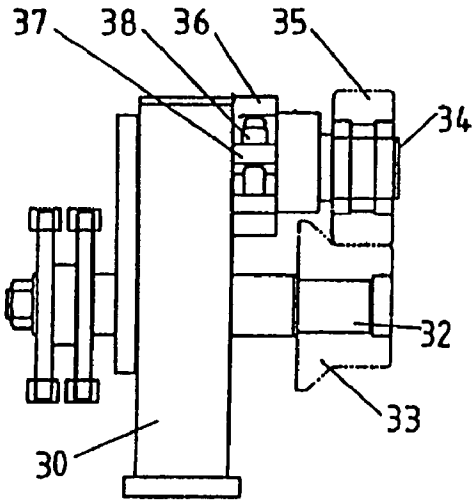
FIG. 6 is a side elevation of FIG. 5.
Figure 5:
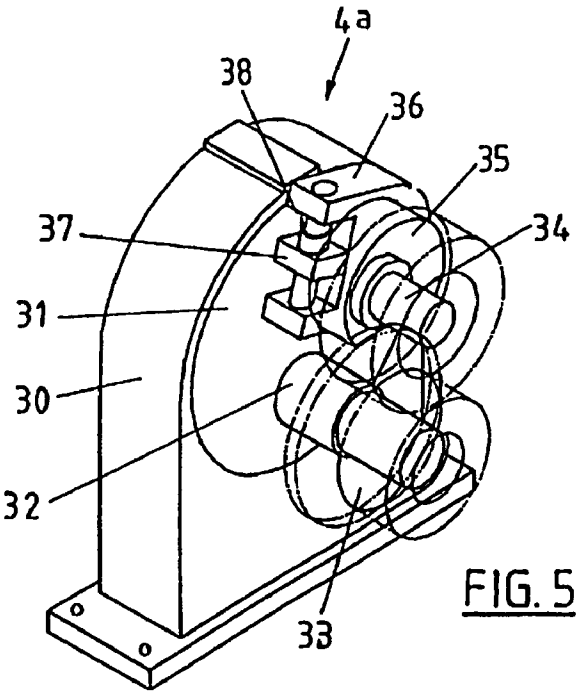

The rollforming station illustrated in FIG. 4 is typical of a later web station in the rollforming apparatus and has the tooling pedestal 22 supporting the first tooling roller 23 on a shaft 24 and the second tooling roller 25 eccentrically mounted on the shaft 26[with the], *a* support frame 27, and abutment member 28[which is moveable with the tooling roller 25]. The reaction means 29 visible in this figure is a compression block which supplies substantially constant reaction force sufficient to achieve rollforming action while allowing movement of the rollforming head 25 about its eccentric mounting thus the roll 25 can move within its working range to accommodate the gauge of material being formed.

A yet further rollforming head 4a is illustrated in FIGS. 5-8 of the accompanying drawings. In this case the tooling pedestal 30 has a rotatable carrier 31 mounted therein and the carrier 31 rotatably supports the shafts 32 and 34 on which the tooling rollers 33 and 35 are mounted. The shaft 34 is eccentrically [located in the tooling roller] *mounted* in a similar manner to that above described. The gauge adjustor has the support frame 36 and the abutment 37 with the compression block 38 providing the resistance force. A particular feature about this rollforming head is that through use of the carrier 31 the positions of the rollforming heads at the station can be reversed and as will be seen in the drawing*s* the tooling roller with the automatic adjustment gauge is located on the top. However the position can simply be reversed by disconnecting the drive unlocking and rotating the carrier 31 to change the top roller to be located as the bottom roller and relocking the carrier and reconnecting the drive.

The automatic gauge adjuster in all embodiments illustrated, may have a preload applicator which by use of a tightening nut or stud or by other suitable means can preload the compression block to set the minimum tooling gap between the tooling rollers. The preload applicator in FIG. 3 is illustrated at 39 and in FIG. 4 at 40 and in FIG. 8 at 41. Conveniently a connecting rod with a head at one end and thread at the other end passes through aligned apertures in the support frame, abutment member and compression block with a nut on the threaded end allowing for preloading. Other mechanical configurations to achieve the purpose of the automatic adjustor as set out above may also be used.

The reaction means in the illustrated examples of rollforming stations is shown as a compression block. This compression block must be selected to provide sufficient pressure during operation to achieve the rollforming and allow within the operating range movement of the eccentrically mounted tooling roller to increase the tooling gap when the gauge of metal being formed is increased.

A particularly suitable compression block material for such an auto gauging application is lurathane with a shore hardness of 90, a tensile strength of 31 and a tear strength of 63. It would be understood however that the desired characteristics may be found in a number of other materials. We have found that in many applications lurathane having a shore hardness from 70 to 100 is acceptable. The characteristics of the compression block must be such that they allow compression for the adjustment movement during the automatic gauging but provide a sufficient reaction pressure to allow effective rollforming. Other rubber material having an appropriate shore hardness to achieve the compression characteristics required could also be used, but from a practical point of view a material which has a long life in use should be selected.

While the reaction means is particularly conveniently delivered in the form of a compression block formed from suitable material, the present invention is not intended to be restricted thereto. FIG. 9 illustrates diagrammatically a series of alternative means of creating the reaction force required. In FIGS. 9a-e 42 represents the eccentrically mounted tooling roller, 43 represents the support means to resist the movement of the [eccentric mounting] *eccentrically mounted tooling roller* and 44 represents the tooling roller preloading means.

Figure 9A:
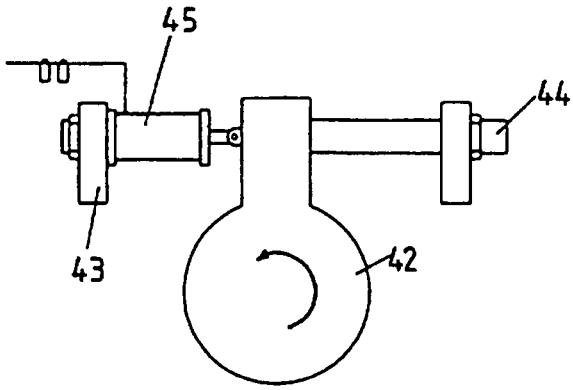
Figure 9D:
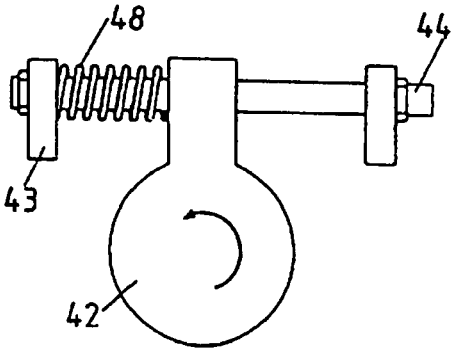
Figure 9B:
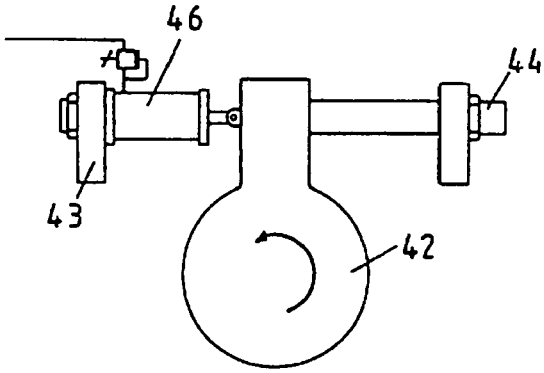
Figure 9E:
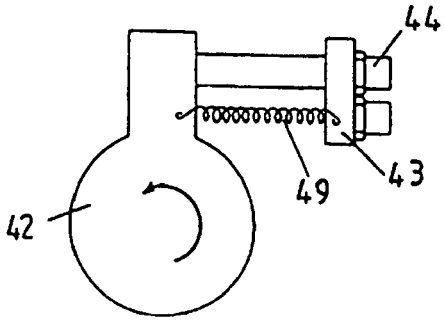
Figure 9C:
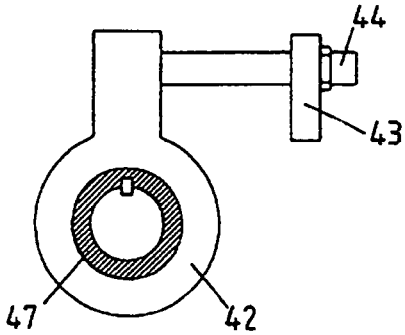

In FIG. 9a the reaction force is generated by an air cylinder or activator 45. In FIG. 9b the reaction force is generated by a hydraulic cylinder 46, in FIG. 9c the reaction force is generated by a sleeve of torsion resistant material 47 mounted within the eccentric mount. In FIG. 9d the action force is generated by a compression spring 48 and in FIG. 9e the reaction force is generated by a tension spring 49. Thus it will be appreciated that a number of different means can be used in the rollforming stations according to the present invention to provide the required reaction force.

As will be apparent from the forgoing description the present invention provides rollforming apparatus that has incorporated in the rollforming stations automatic adjustment means within the allowed tolerances for accommodating varying gauges of material being formed. The adjustment mechanism can be preloaded and the apparatus set to operate with a minimum of adjustment necessary during operation within the tolerances provided. This means there is no labour or complex servo equipment to achieve adjustment to a new gauged material and the automatic adjustment mounting is smooth thus not damaging the lead in search of a new gauge of material being formed.

I claim:

[1. A rollforming station for a rollforming apparatus for forming profile shapes in a formable material, the rollforming station comprising:

a tooling pedestal including means for mounting the tooling pedestal on the rollforming apparatus, a rollforming head mounted on said tooling pedestal, said rollforming head having a first tooling roller rotatably mounted on a first shaft supported by said pedestal, a second tooling roller rotatably mounted on a second shaft, said first and second tooling roller cooperating to form profile shapes by transversely deflecting said formable material into a shape having a nonplanar cross-section, and means rotatable mounted on said pedestal for supporting the second shaft eccentrically with reference to the centre of the second tooling roller so that a force applied in the direction of material feed through the tooling rollers will increase a tooling gap between the first and second tooling rollers, and an automatic gauge adjustor including means for resisting the movement of the second tooling roller to increase the tooling gap, said resisting means applying a force sufficient to achieve the rollforming action while allowing movement of the second tooling roller about the eccentric supporting means so that the second tooling roller will move against the resisting means in the direction of the material feed to accommodate the gauge of material being formed.]

[2. A rollforming station as claimed in claim 1, wherein the automatic gauge adjustor resisting means comprises a support fixed relative to the pedestal, and a reaction element reacting to relative movement between the second tooling roller and the support.]

[3. A rollforming station as claimed in claim 1, wherein the automatic gauge adjustor comprises a support frame mounted on the tooling pedestal, an abutment member carried on the eccentric supporting means and moveable relative to the support frame, and a reaction element creating a force to resist movement between the abutment member and the support frame.]

[4. A rollforming station as claimed in claim 1, wherein said automatic gauge adjustor includes a preload applicator to set the minimum tooling gap between the tooling rollers.]

[5. A rollforming station as claimed in claim 2, wherein the reaction element comprises a compression block.]

[6. A rollforming station as claimed in claim 5, wherein the compression block is formed from lurathane with a shore hardness of between about 70 to about 100.]

[7. A rollforming station as claimed in claim 6, wherein the lurathane compression block has a shore hardness of about 90.]

[8. A rollforming station as claimed in claim 2, wherein the reaction element comprises a spring.]

[9. A rollforming station as claimed in claim 2, wherein the reaction element creates resistant pressure using fluid pressure.]

[10. A rollforming station as claimed in claim 2, wherein the reaction element is a torsion resistant material mounted within the eccentric mounting means.]

[11. A rollforming station as recited in claim 1, further comprising a carrier rotatably mounted on the tooling pedestal for supporting the rollforming head.]

[12. A rollforming station as recited in claim 1, further comprising a carrier rotatably mounted on the tooling pedestal for supporting the rollforming head.]

[13. A rollforming station as claimed in claim 1, wherein the resisting means applies a substantially constant force.]

[14. A rollforming apparatus for forming profile shapes from formable material the rollforming apparatus comprising:

a frame;

a support bed on the frame;

a tooling pedestal having means for mounting the tooling pedestal to the frame;

a rollforming head mounted on the tooling pedestal, the rollforming head having a first tooling roller rotatably mounted on a first shaft supported by the pedestal, a second tooling roller rotatably mounted on a second shaft, said first and second tooling roller cooperating to form profile shapes by transversely deflecting said formable material into a shape having a nonplanar cross-section, and means for rotatably mounting the second shaft on the pedestal eccentrically with reference to the centre of the second tooling roller so that a force applied in the direction of material feed through the tooling rollers will increase a tooling gap between the first and second tooling rollers; and an automatic gauge adjustor having means for resisting the movement of the second tooling roller to increase the tooling gap, the resisting means applying a force sufficient to achieve the rollforming action while allowing movement of the second tooling roller about the eccentric mounting means so that the second tooling roller will move against the resisting means in the direction of the material feed to accommodate the gauge of material being formed.]

[15. A rollforming station as claimed in claim 14, wherein the automatic gauge adjustor resisting means comprises a support fixed relative to the pedestal, and a reaction element reacting to relative movement between the second tooling roller and the support.]

[16. A rollforming station as claimed in claim 14, wherein the automatic gauge adjustor comprises a support frame mounted on the tooling pedestal, an abutment member carried on the eccentric supporting means and moveable relative to the support frame, and a reaction element creating a force to resist movement between the abutment member and the support frame.]

[17. A rollforming station as claimed in claim 14, wherein said automatic gauge adjustor includes a preload applicator to set the minimum tooling gap between the tooling rollers.]

18. A method for adjusting rollforming equipment to accommodate varying gauges of formable material, said method comprising the steps of:

providing a rollforming roll station, mounting a rollforming roll in the rollforming station on a rotatable eccentric *mounting*, and applying a force sufficient to achieve the rollforming action against rotation of the rollforming roll about the eccentric mounting while allowing movement of the rollforming roll about the eccentric mounting so that the rollforming roll will move against the source of pressure in the direction of the material feed to *automatically* accommodate [the gauge] *different gauges* of material *by automatically adjusting to increase a tooling gap between the rollforming roll and a further rollforming roll when the gauge of the formable material being formed is increased,* while maintaining the required force to perform the rollforming operation to form a profile shape by transversely deflecting the formable material into a shape having a nonplanar cross-section.

19. A method for adjusting rollforming equipment as claimed in claim 18, further comprising the step of preloading the tooling roller to set the minimum tooling gap between the tooling roller and a second tooling roller on the rollforming station.

20. A method for adjusting rollforming equipment as claimed in claim 18, wherein the step of applying a source of pressure sufficient to achieve the rollforming action against rotation of the rollforming roll about the eccentric mounting, comprises applying a substantially constant force.

* * * * *